United States Patent [19]

Nohara et al.

[11] Patent Number: 5,699,323
[45] Date of Patent: Dec. 16, 1997

[54] ELECTRONIC DEVICE

[75] Inventors: Satoshi Nohara, Saitama; Tomohiro Mitsuhashi, Tokyo, both of Japan

[73] Assignee: Sony Corporation, Tokyo, Japan

[21] Appl. No.: 640,060

[22] Filed: Apr. 30, 1996

[30] Foreign Application Priority Data

May 19, 1995 [JP] Japan .................. P07-144160

[51] Int. Cl.$^6$ .................. G04C 9/00; G09G 5/36; H04N 5/445
[52] U.S. Cl. .................. 368/187; 345/140; 345/156; 348/563; 348/734
[58] Field of Search .................. 368/10, 82–84, 368/185–187, 235; 340/706–707, 711–712; 345/156, 157, 173, 140; 348/553

[56] References Cited

U.S. PATENT DOCUMENTS 4,965,557 10/1990 Schepers et al. .................. 340/711
5,153,580 10/1992 Pollack .................. 340/825.25
5,327,160 7/1994 Asher .................. 345/156

*Primary Examiner*—Vit W. Miska
*Attorney, Agent, or Firm*—Jay H. Maioli

[57] ABSTRACT

A timer set key is depressed and a set time is incremented a number of times, if it is determined that an incremented set time is equal to "OFF", then the processing proceeds and the incremented set time is displayed during a time period longer than about 100 milliseconds, which is a display time of a normal set time, e.g., about 500 milliseconds. Therefore, when the set time is successively incremented from the set time to the set time during the time that the timer set key is depressed, only "OFF" is displayed for a time period longer that those of other set times.

6 Claims, 7 Drawing Sheets

ELECTRONIC DEVICE

BACKGROUND OF THE INVENTION

The present invention relates to an electronic device in which a desired set value is selected by successively varying set values used to set a timer, a picture quality or a sound quality in accordance with a predetermined operation.

Handy set type alarm clock timers have hitherto been known to energize a television receiver or the like at a predetermined time.

It is customary that, when a user sets a time of timer-activated recording, the user directly enters day and time at which audio-video device such as a television receiver is energized in the form of "Tuesday/7:30 P.M.", for example. On the other hand, if the user uses the handy set type alarm clock timer, then the user can set when the audio-video device is energized through operation of predetermined keys. Specifically, when the present time is "11:00 P.M., if the user wants to turn on a power switch of the television receiver at "7:00 A.M." the next morning, then it is sufficient for the user to simply enter "8 hours" as a timer set time.

FIG. 1 of the accompanying drawings shows a manner in which the user sets a time of the above alarm clock timer.

As shown in FIG. 1, the user can set a time of the alarm clock timer at the unit of 10 minutes, and a set time is 12 hours at maximum and has 73 steps. As one of the set times, there is provided an item "OFF" which operates to de-energize the alarm clock timer if the user selects this item "OFF" when this alarm clock timer is not in use.

When the user wants to set a time of the alarm clock timer, the user depresses a timer set key provided on a console of a remote commander or an audio-video device body. During the time the user depresses the timer set key, a time of alarm clock timer is successively incremented in the sequential order of the set time S001 "OFF", set time S002 "10 minutes", set time S003 "20 minutes", . . . , set time S072 "11 hours and 50 minutes", set time S073 "12 hours". If the set time reaches the set time S073 "12 hours", then a time of the alarm clock timer returns to the set time S001 "OFF", and the time of the alarm clock timer cycles from the set time S001 to the set time S072 until the user ceases depressing the timer set key. Accordingly, since these set times (S001 to S072) are incremented at the unit of 10 minutes, if depression of the timer set key is released at a desired time, then the set time of the alarm clock timer can be set at the unit of 10 minutes, for example.

Although not shown, a time of the alarm clock timer may be decremented from the set time S073 to the set time S001.

Since the set time of alarm clock timer is displayed on a suitable display means such as a cathode-ray tube (simply referred to as a "CRT") by depression of the timer set key, the user is able to determine a set time by ceasing depression of the timer set key at a desired set time while watching set times that are being incremented (or decremented) on the picture screen of the CRT.

According to the alarm clock timer, the user need not enter timer data of set time by use of numeral keys etc., unlike the normal timer. Therefore, the user can easily set a time of timer by use of only one timer set key.

When various elements concerning a picture quality such as a contrast and stereo sound left-channel/right-channel balance are adjusted, adjustment bars are displayed on the picture screen of the CRT. The user can obtain a desired picture quality and a desired sound balance by operating operation keys such as up-key/down-key or left-key/right-key while watching the graduations indicating adjustment level.

FIGS. 2A through 2D are schematic diagrams used to explain a manner in which the level of a picture quality such as contrast, for example, is adjusted. FIGS. 2A, 2B are diagrams used to explain a manner in which the level is increased, and FIGS. 2C, 2D are diagrams used to explain a manner in which the level is decreased.

When the above operation key is operated, adjustment bars B shown in FIGS. 2A, 2B and 2C, 2D are displayed on the picture screen of the CRT. Each of the adjustment bars B has a scale indicating adjustment values comprising adjustment levels of 33 steps ranging from a minimum value to a maximum value. A center portion of the adjustment bar B is set to "standard value" indicative of reference value of the adjustment level. A cursor C indicates the current adjustment level. This cursor C is flashed to an adjustment level corresponding to the current adjustment value for a predetermined period of time during the time the operation key is depressed, and then turned off. Then, the cursor C is flashed to the next adjustment level for a predetermined period of time, and turned off.

The display time of the cursor C is 100 milliseconds, for example, and hence the user can watch the cursor C as if the cursor C were being moved at a predetermined speed. Then, the adjustment level indicated by the cursor C at the time depression of the operation key is finished becomes an adjustment value.

If the user depresses the up-key in the state shown in FIG. 2A, then the cursor C is moved by one step in the arrow U direction to indicate the adjustment level shown in FIG. 2B. Then, at the time depression of the up-key is finished, the adjustment value is determined. If the down-key is operated in the state shown in FIG. 2C, then the cursor C is moved by one step each in the arrow D direction to indicate the adjustment level shown in FIG. 2D. Then, at the time depression of the down-key is finished, the adjustment value is determined.

As shown in FIG. 1, the timer set time is incremented at a constant speed of about 100 milliseconds per step in consideration of the transition time of the set times (S001 to S072).

Therefore, a big change of set time can be carried out smoothly. However, when the user intends to select a predetermined set time of "OFF" shown in the set time S001, if the user releases the timer set key at a wrong timing, then the above set time is passed.

In this case, since the timer set key is only incremented (or decremented) as described above, the user has to keep depressing the timer set key until the set time S001 appears again. Further, if the set time does not reach the set time S001, then the user has to operate the timer set key little by little. Accordingly, it is not easy for the user to accurately set the set time to the predetermined set time such as "OFF".

Further, as shown in FIGS. 2A through 2D, when the picture quality such as the contrast is adjusted, the user operates the operation keys such as the up-key or down-key while watching the cursor C of the adjustment bar B displayed on the picture screen of the CRT. However, since the cursor C is moved from the minimum value to the maximum value at a constant speed, it is difficult to accurately stop the cursor C at "standard value". Upon adjustment, it is frequently observed that the cursor C is stopped at the adjustment level ahead of "standard value" or the cursor C is passed through "standard value". Thus, the user has to operate the up-key or the down-key little by little.

SUMMARY OF THE INVENTION

In view of the aforesaid aspect, it is an object of the present invention to provide an electronic device in which desired setting and adjustment can be carried out efficiently and with ease.

According to an aspect of the present invention, there is provided an electronic device which is comprised of a control unit for controlling an adjustment value or a set value in accordance with a predetermined operation such that the adjustment value or the set value is successively increased or decreased during the operation, and a display unit for displaying a reference value of the adjustment value or the set value during a time period longer than a time period in which other values are displayed.

According to the present invention, since a time during which the reference value of the set value and the adjustment value is displayed is set to be longer than a time during which other values are displayed, it is possible to prevent a set value from passing the reference value during setting and adjustment. Thus, the user can carry out setting and adjustment more easily.

DETAILED DESCRIPTION OF THE PREFERRED EMBODIMENTS

Embodiments in which an electronic device according to the present invention is applied to a television receiver, for example, will be described below with reference to the drawings.

Figure 3:
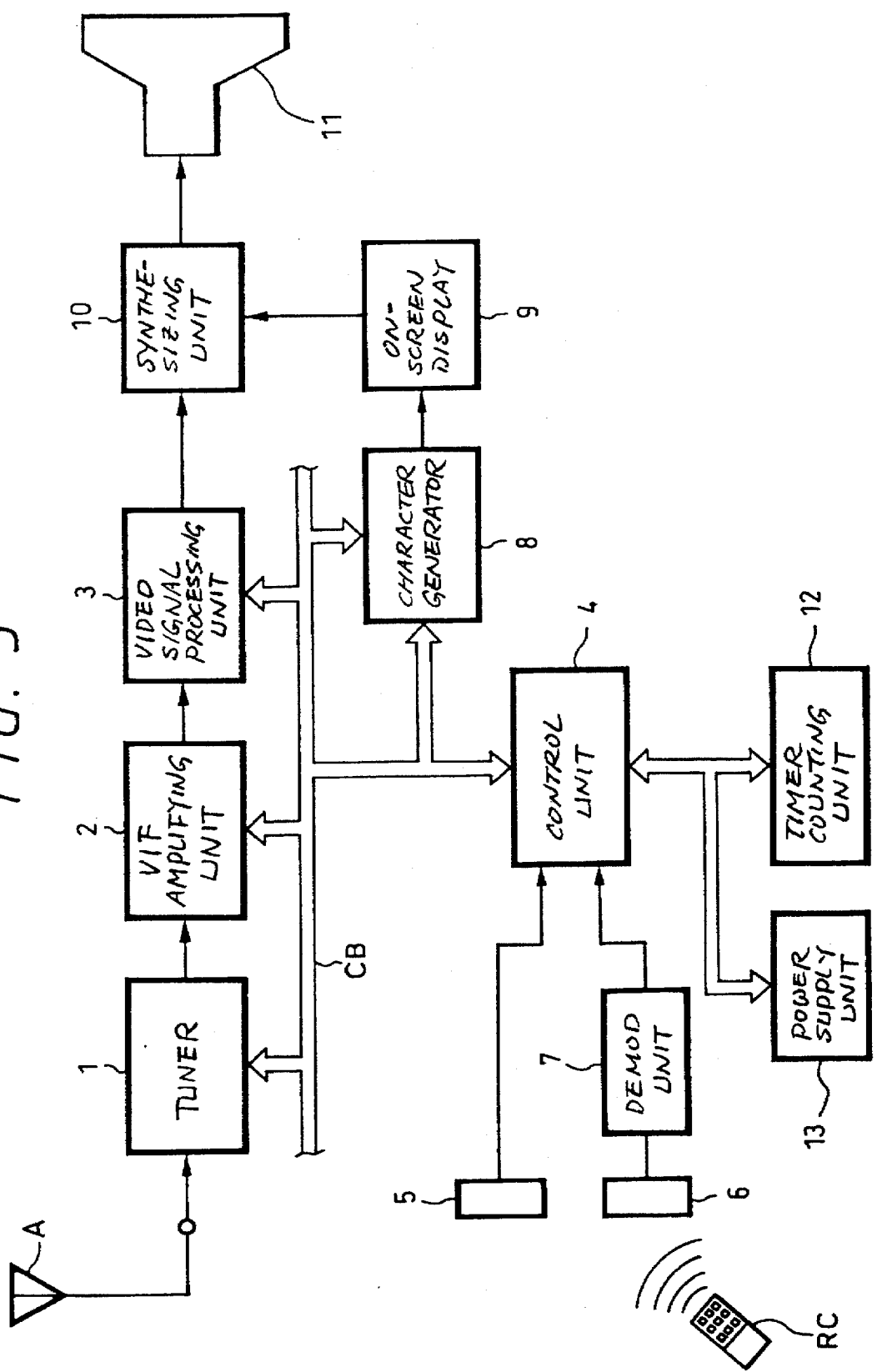
FIG. 3 is a block diagram showing a circuit arrangement of a television receiver according to the present invention.

FIG. 3 shows, in block form, a television receiver according to the present invention.

As shown in FIG. 3, the broadcast wave of ground wave broadcast or satellite broadcast is received at an antenna A, and selected by a tuner 1. The tuner 1 demodulates the selected broadcast wave to provide a video signal. The video signal from the tuner 1 is supplied through a video intermediate frequency (VIF) amplifying unit 2 to a video signal processing unit 3. The video signal processing operations unit 3 effects a variety of video signal processing, such as separation of a chroma signal, generation of color difference signals or extraction of vertical/horizontal synchronizing signals, on the video signal supplied thereto to output RGB signals.

A control unit 4 controls the above various function circuits through a control bus CB in accordance with control commands supplied thereto from a console unit 5 disposed on the television receiver body or control commands transmitted thereto from a remote commander RC. Infrared control commands, for example, transmitted from the remote commander RC are introduced into a light-receiving unit 6, demodulated by a demodulating (DEMOD) unit 7, and supplied to the control unit 4.

The console unit 5 and the remote commander RC have disposed thereon an alarm clock timer set key for setting a timer time, operation keys such as picture quality adjustment level up-key or down-key for setting various adjustment items and effecting various adjustments and operation keys for effecting general operations (e.g., channel selection and volume adjustment, etc.).

Figure 1:
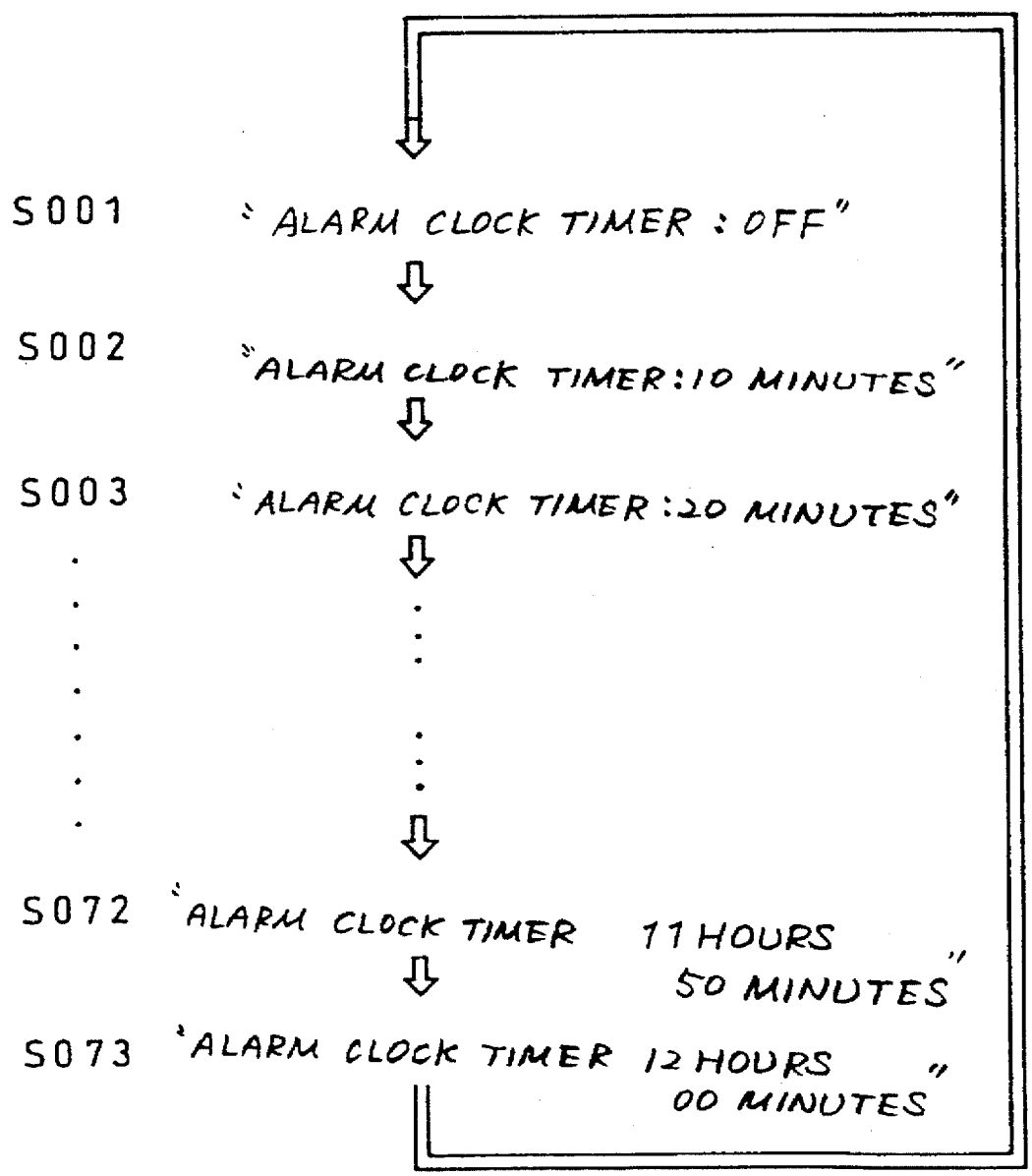
FIG. 1a a schematic diagram used to explain a manner in which an alarm clock timer is set.

According to this embodiment, when a time of the alarm clock timer is set as shown in FIG. 1, a display time of the reference value (e.g.,. "OFF") which is a reference time in a set time is set to be longer than other set times. Moreover, when the level adjustment such as picture adjustment is effected as shown in FIGS. 2A through 2D, a time during which the cursor C indicates the reference value (e.g., "standard value") is set to be longer than a time of another adjustment level.

A character generator 8 generates character signals which are used to superimpose a variety of information such as selected channel, picture quality adjustment level or set time of the alarm clock timer on a displayed picture. Specifically, during the time that a set time of the alarm clock timer or picture quality adjustment level is varied, the character generator 8 generates a character signal for incrementing a time display at a predetermined timing under control of the control unit 4. The character signal generated from the character generator 8 is supplied through an on-screen display 9 to a synthesizing unit 10.

The synthesizing unit 10 superimposes the character signal supplied thereto from the on-screen display 9 upon the RGB signals supplied thereto from the video signal processing unit 3, and supplies a resultant video signal to a CRT 11.

Therefore, a variety of information can be displayed on the picture screen of the CRT 11 at predetermined positions under the condition that information is superimposed upon a picture of broadcast program selected by the tuner 1.

A timer counting unit 12 counts a time set by the alarm clock timer, for example, and supplies a control command which energizes the television receiver at a set time.

A power supply unit 13 supplies a voltage to the above-mentioned function circuits composing the television receiver under control of the control unit 4 in accordance with a power on/off control command supplied thereto from the remote commander RC or the timer counting unit 12.

A manner in which a time of an alarm clock timer is set will be described with reference to a flowchart forming FIG. 4. In this embodiment, the set time S001 at which the alarm clock timer is turned off ("OFF") as described above with reference to FIG. 1 is set to the reference value.

Figure 4:
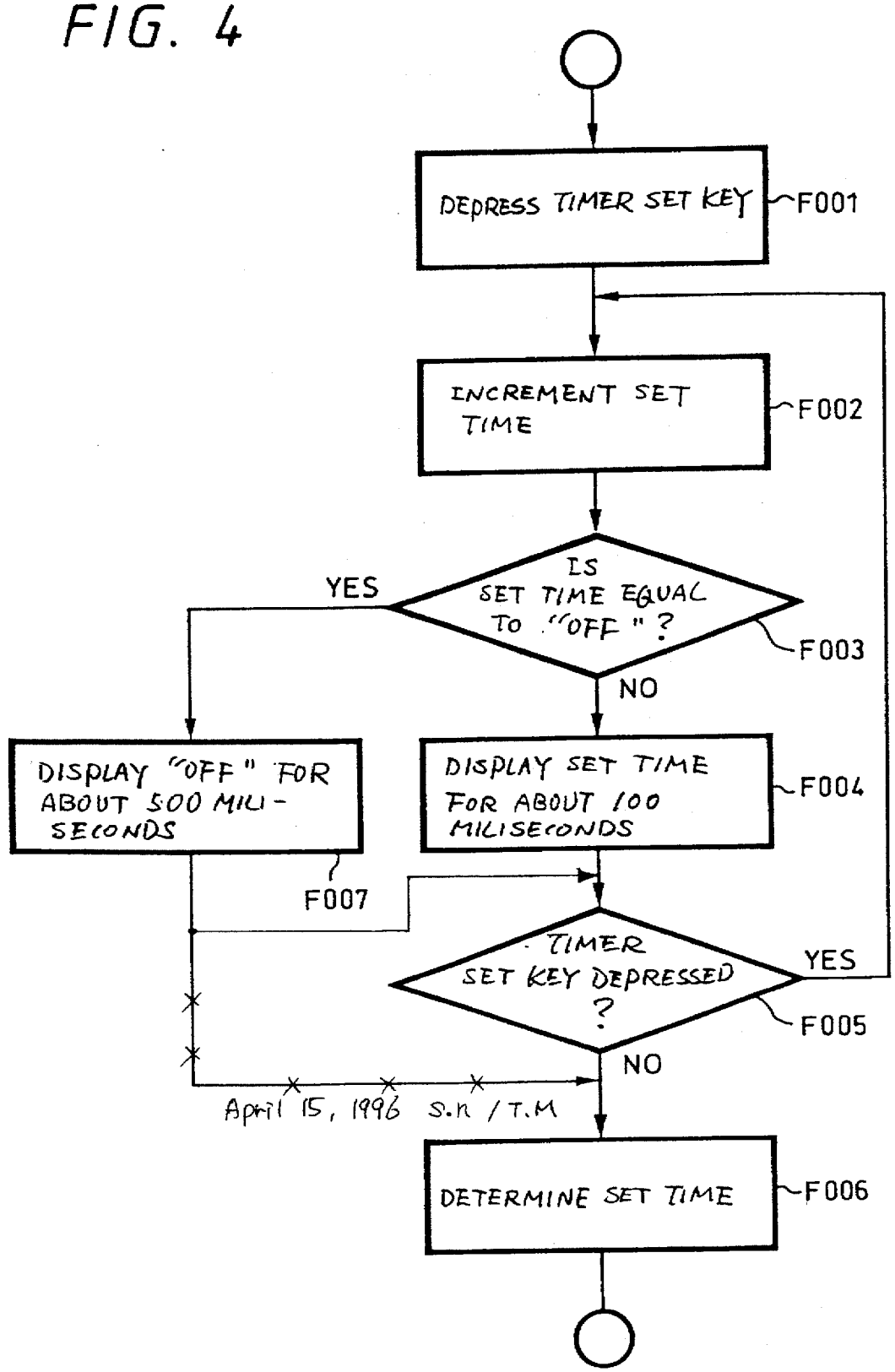
FIG. 4 is a flowchart to which reference will be made in explaining a manner in which a time of an alarm clock timer of the television receiver according to a first embodiment is set.

Referring to FIG. 4, when a time of the alarm clock timer is set, the timer set key provided on the console 5 or the remote commander RC is depressed at step F001. When the timer set key is depressed, a set time is displayed on the picture screen of the CRT 11, and a set time is started being incremented at step F002, i.e., the set time shown in FIG. 1 is incremented. Then, the processing proceeds to the next decision step F003, whereat it is determined whether or not the set time is equal to "OFF". If the set time is not equal to "OFF" as represented by a NO at decision step F003, then the processing proceeds to the next step F004, whereat the above set time is displayed on the picture screen of the CRT 11 during a time period of about 100 milliseconds.

The processing proceeds to the next decision step F005, whereat it is determined whether or not the timer set key is depressed. If the timer set key is depressed as represented by a YES at decision step F004, then the processing returns to step F002, whereat the set time is incremented. If on the other hand the timer set key is not depressed as represented by a NO at decision step F005, then the processing proceeds to step F006, whereat a time of the set time obtained at that time is determined as a set time.

When the timer set key is depressed at step F001 and the set time is incremented at steps F002 to F006, if the incremented set time is equal to "OFF" as represented by a YES at decision step F003, then the processing proceeds to step F007, whereat "OFF" is displayed on the picture screen of the CRT 11 for a time period longer than the 100 milliseconds at step F004, e.g., about 500 milliseconds. Thus, when the set time is incremented from the set time of S001 to the set time of S073 during the time that the timer set key is depressed, then only "OFF" is displayed on the picture screen of the CRT 11 during a time period longer than other set times S002 to S073. After a time period of about 500 milliseconds is elapsed at step F007, it is determined at decision step F005 whether or not the timer set key is depressed. If the timer set key is depressed as represented by a YES at decision step F005, then the processing returns to step F002, whereat the set time is kept being incremented. If on the other hand the timer set key is not depressed as represented by a NO at decision step F005, then the processing proceeds to step F006, whereat "OFF" is selected.

Accordingly, the user can finish depressing the timer set key after having visually confirmed "OFF" on the picture screen of the CRT 11. Therefore, it becomes easy for the user to select "OFF" from the 73 steps shown in FIG. 1.

Another example of a manner in which a time of the alarm clock timer in the television receiver according to the present invention will be described below with reference to a flowchart forming FIG. 5.

Figure 5:
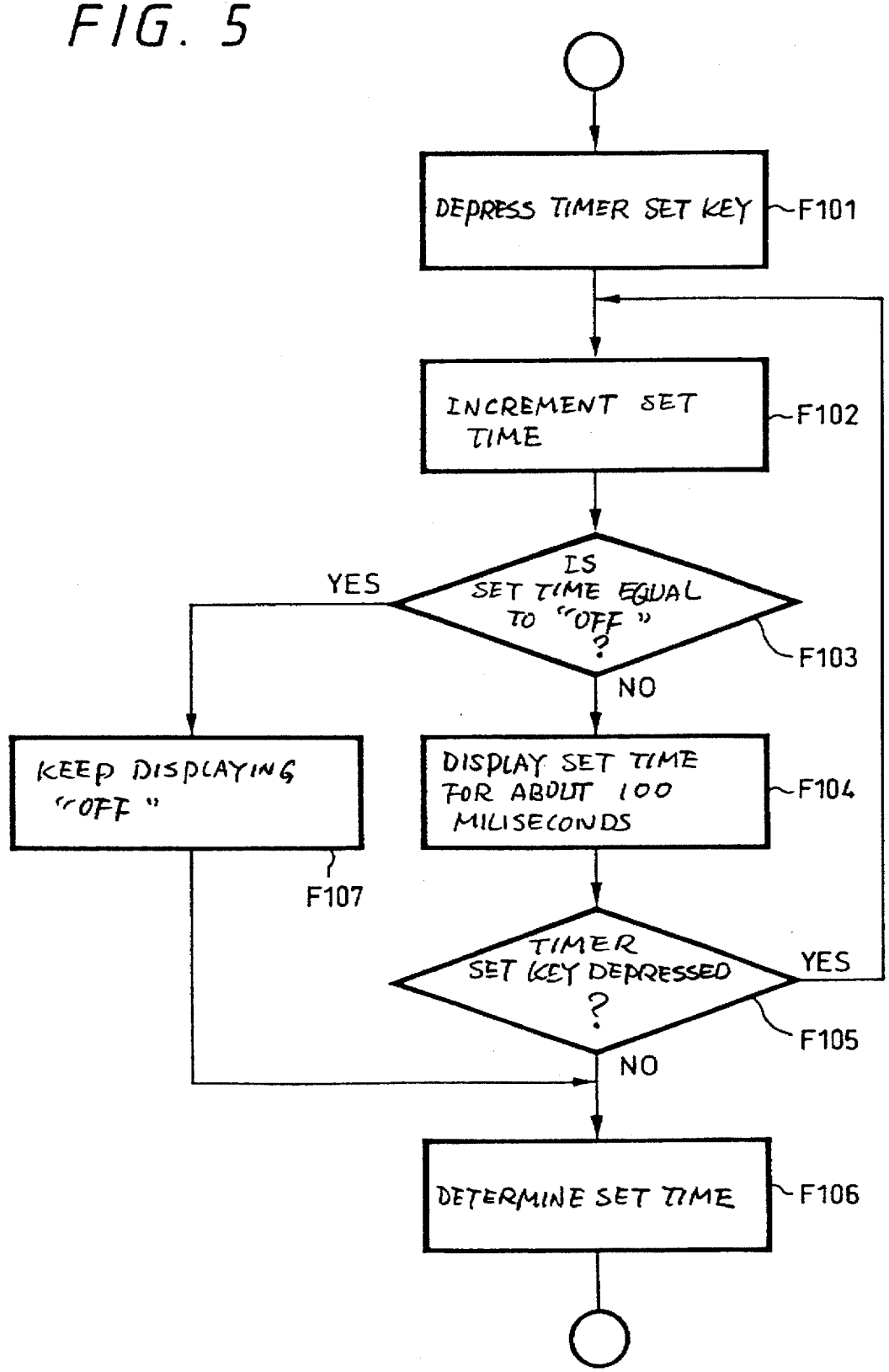
FIG. 5 is a flowchart to which reference will be made in explaining another example of a manner in which a time of an alarm clock timer of the television receiver according to the first embodiment is set.

If the set time is equal to "OFF" as represented by a YES at decision step F103 in FIG. 5, then the processing proceeds to the next step F107, whereat "OFF" is kept being displayed on the picture screen of the CRT 11. Then, the processing proceeds to the next decision step F105, whereat it is determined whether or not the timer set key is depressed. If the timer set key is not depressed as represented by a NO at decision step F105, then the processing proceeds to step F106, wherein "OFF" is selected as the set time. In this case, if the user wants to vary a set time again from a time point of "OFF", then the user finishes depression of the timer set key for a moment, and depresses the timer set key one more time.

Therefore, when the user wishes to select "OFF", the user need not finish depression of the timer set key in a hurry at the time "OFF" is displayed on the picture screen of the CRT 11. Furthermore, if the user wants to select desired set times other than "OFF", then the set time is started being incremented when the user depresses the timer set key one more time.

Another embodiment in which a picture quality such as contrast is adjusted will be described with reference to a flowchart forming FIG. 6. In the embodiment below, "standard value" of the adjustment bar B shown in FIGS. 2A through 2D will be referred to as "reference value".

Figure 2A:
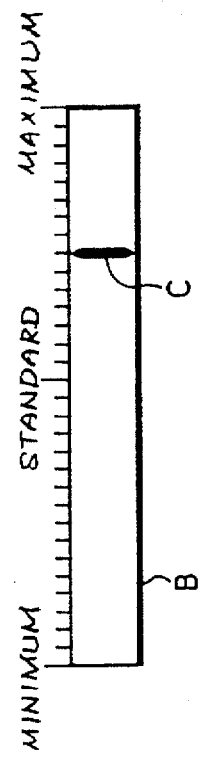
FIGS. 2A through 2D are diagrams used to explain a manner in which a level of a picture quality such as contrast is adjusted.
Figure 2B:
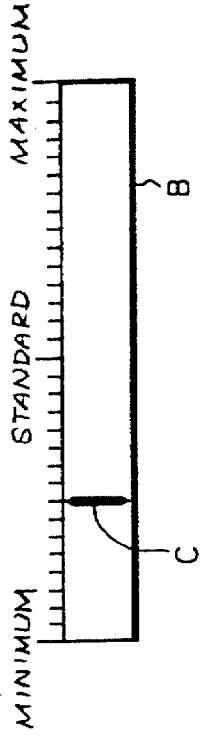
Figure 2C:
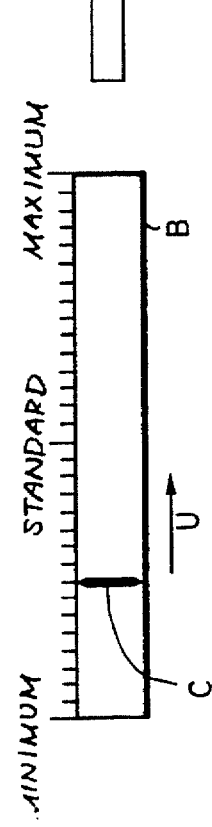
Figure 2D:
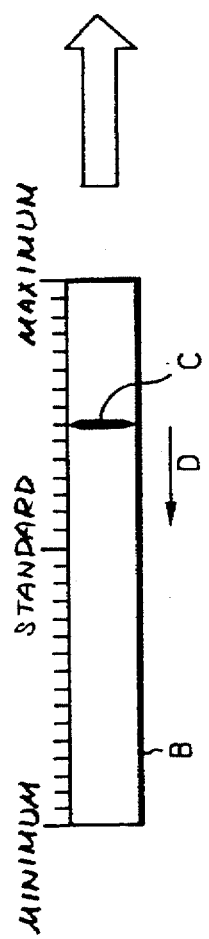
Figure 6:
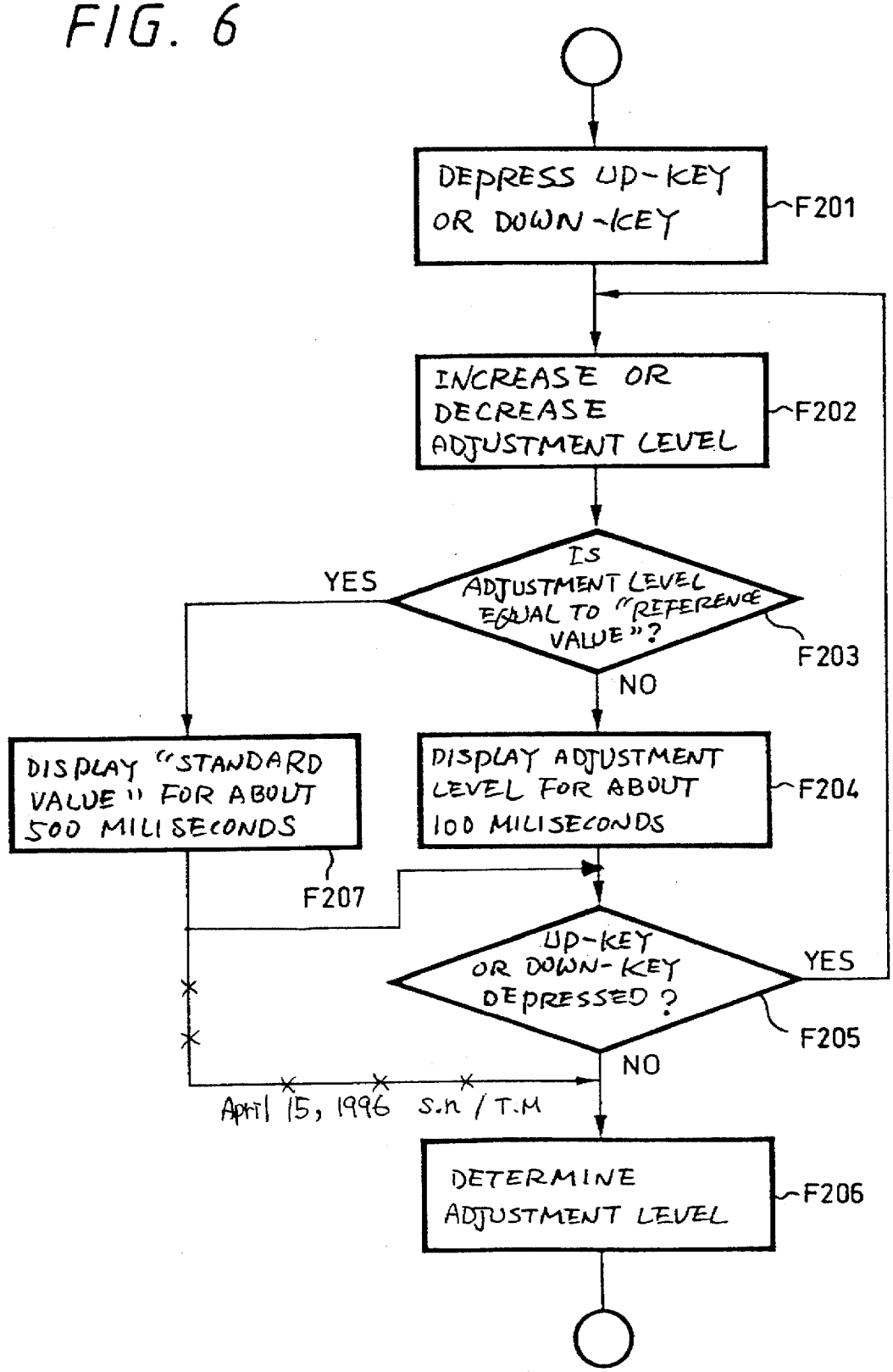
FIG. 6 is a flowchart to which reference will be made in explaining a manner in which a picture quality of the television receiver according to a second embodiment is adjusted.

Referring to FIG. 6, when the contrast is adjusted, the user depresses an up-key or down-key provided on the console 5 or the remote commander RC at step F201. When the user depresses the up-key or down-key, the adjustment bar B and the cursor C are displayed on the picture screen of the CRT 11, and a contrast value is started being increased or decreased at step F202. Specifically, the adjustment level is increased by one step as shown in FIGS. 2A, 2B or the adjustment level is decreased by one step each as shown in FIGS. 2C, 2D. Then, it is determined at the next decision step F203 whether or not the increased or decreased adjustment level is equal to "standard value". If the adjustment level is not equal to "standard value" as represented by a NO at decision step F203, then the processing proceeds to the next step F204, whereat such adjustment level is displayed by the cursor C during a time period of about 100 milliseconds.

The processing proceeds to the next decision step F205, whereat it is determined whether or not the up-key or the down-key is depressed. If the up-key or the down-key is depressed as represented by a YES at decision step F205, then the processing returns to step F202, whereat the adjustment level is increased or decreased by one step. If on the other hand the up-key or the down-key is not depressed, i.e., depression of the up-key or the down-key is finished as represented by a NO at decision step F205, then the processing proceeds to step F206, whereat the adjustment level obtained at that time is determined as the adjustment value.

When the up-key or down-key is depressed at step F201 and the adjustment level is increased or decreased at step F202 through step F206, if the increased or decreased adjustment level is "standard value" as represented by a YES at decision step F203, then the processing proceeds to the next step F207, whereat the cursor C displays "standard value" during a time period longer than 100 milliseconds at step F204, e.g., about 500 milliseconds. Therefore, when the adjustment level passes "standard value" during the up-key or down-key is depressed, only the "standard value" is displayed by the cursor C for a time period longer than those of other adjustment levels.

After a time period of about 500 milliseconds is elapsed, if the up-key or the down-key is depressed as represented by a YES at decision step F205, then the processing returns to step F202, whereat the adjustment level continues being increased or decreased. If depression of the up-key or the down-key is finished as represented by a NO at decision step F205, then the processing proceeds to the next step F206, whereat "standard value" is selected as the adjustment level.

Accordingly, the user can finish depressing the up-key or the down-key after having visually confirmed that the cursor C displays "standard value" on the adjustment bar B displayed on the picture screen of the CRT 11. Therefore, it becomes easy for the user to select "standard value" from the 33 steps' shown in FIGS. 2A through 2D.

A modified example of the second embodiment will be described with reference to a flowchart forming FIG. 7.

Figure 7:
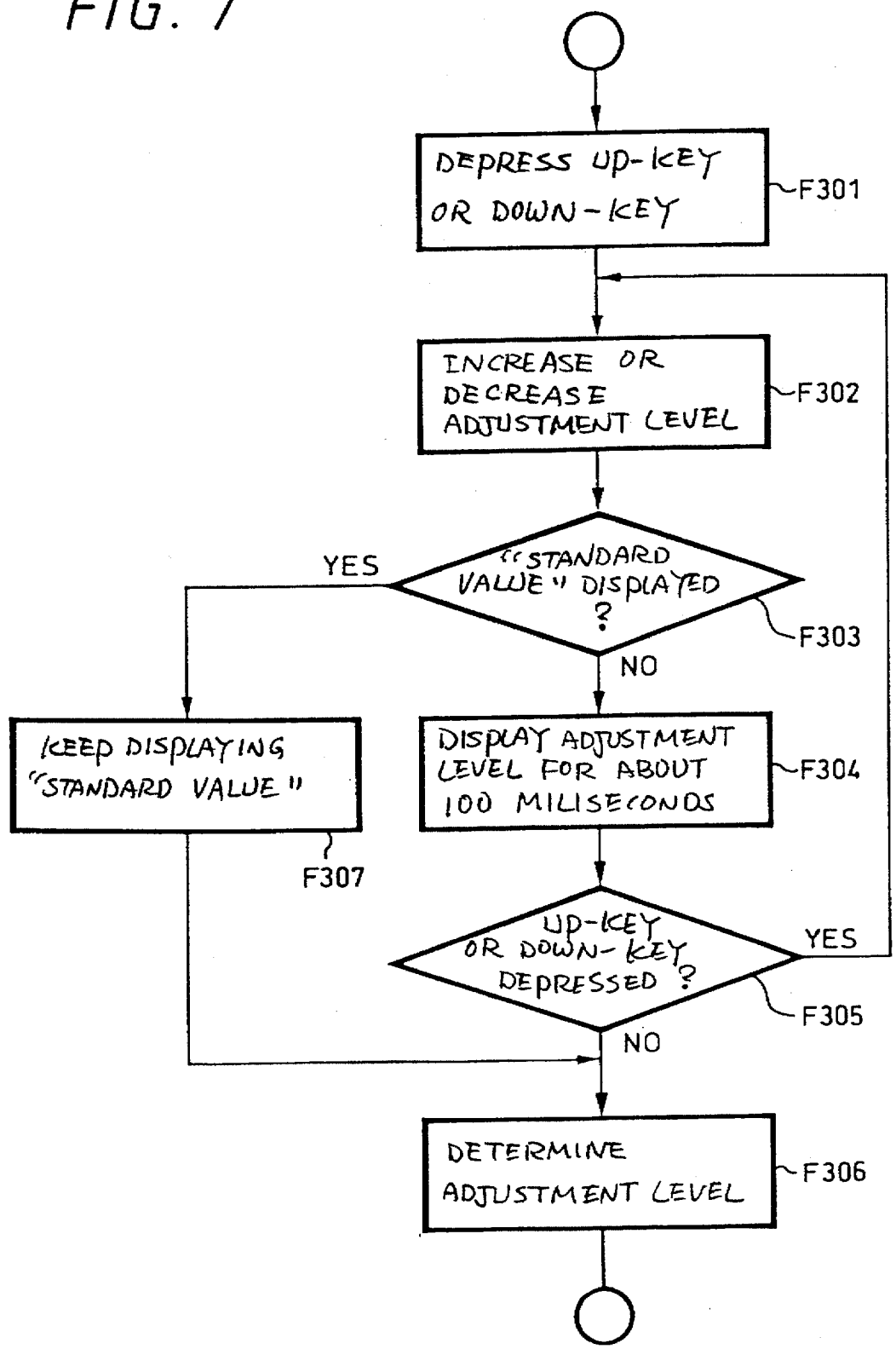
FIG. 7 is a flowchart to which reference will be made in explaining another example of a manner in which a picture quality of the television receiver according to the second embodiment is adjusted.

Referring to FIG. 7, if "standard value" is displayed by the cursor C as represented by a YES at decision step F303, then the processing proceeds to the next step F307, whereat "standard value" is kept being displayed. Then, if depression of the up-key or the down-key is finished as represented by a NO at decision step F305, then the processing proceeds to the next step F306, whereat "standard value" is selected as the adjustment level. In this case, when the user wishes to vary the adjustment level from "standard value" one more time, the user temporarily finishes depression of the up-key or the down-key, and depresses the up-key or the down-key one more time.

Therefore, when the user wishes to select "standard value", the user need not finish depression of the up-key or the down-key in a hurry at the time "standard value" is displayed. Furthermore, when the user wants to select adjustment levels other than "standard value", the adjustment level is started being increased or decreased by depressing the up-key or the down-key one more time.

In the first and second embodiments, the time during which the reference value is displayed is about 500 milliseconds. However, the present invention is not limited thereto, and such time may be set to be longer than times indicative of other adjustment levels and set times. If the user sets the duration of the above time freely, the electronic device according to the present invention becomes more convenient.

While the television receiver has so far been described as the example of electronic devices in the first and second embodiments, in particular, the alarm clock timer may be applied to electronic devices having a timer-activated function, such as a VCR (video cassette recorder).

Furthermore, in the first and second embodiments, the timer function and the picture quality adjustment have been described by way of example. However, the present invention is not limited thereto, and the principle of the present invention may be similarly applied to electronic devices so long as the electronic devices are such that the adjustment value or set value can be successively increased or decreased by predetermined key operations, and that the level adjustment can be carried out or the set time can be set while the user can visually confirm these values displayed on the picture screen of the CRT 11.

As described above, according to the present invention, when the user sets the alarm clock timer to the reference point such as "OFF" or when the user sets the picture quality adjustment such as a contrast to the reference value such as "standard value" or the like while watching numerical values or the like displayed on the picture screen of the CRT, if the reference value is displayed on the picture screen of the CRT during a time period longer than those of other values, then upon setting or upon adjustment, then it is possible to lessen mistakes such as when the set value or adjustment value passes the reference value or the set value or adjustment value does not reach the reference value. Thus, the user can visually confirm the reference value displayed on the picture screen of the CRT, and select the set time or adjustment level with enough time.

In particular, when a time in the alarm clock timer is set by increasing or decreasing a set value in one direction, it is possible to prevent the set time from passing the predetermined value. Thus, the alarm clock timer can be made easier to handle.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A system for controlling operations of an electronic device, the system comprising:

control means for controlling one of an adjustment value relating to one of the operations of the electronic device and a time set value relating to a time of performance of said one of the operations of the electronic device in accordance with said one of said operations of said electronic device, whereby one of said adjustment value and said time set value is successively increased or decreased during said one of said operations; and display means for displaying a reference value of one of said adjustment value and said time set value for a time period longer than a time period in which values other than said reference value are displayed.

2. An electronic device as claimed in claim 1, wherein control means includes means for varying said reference value.

3. A method of displaying an adjustment value to a user of an electronic device in which the user operates an adjustment setting key, comprising the steps of:

changing an adjustment level relating to an operation of the electronic device by depressing the adjustment setting key;

determining whether the changed adjustment level is equal to a predetermined reference level;

upon determining the changed adjustment level is not equal to the reference level, displaying the changed adjustment level for a first predetermined period of time;

upon determining the changed adjustment level is equal to the reference level, displaying the reference level for a second predetermined period of time longer than said first period of time; and determining whether the adjustment setting key is depressed and, if depressed, repeating said step of changing and, if not depressed, determining the adjustment level of the electronic device.

4. The method of displaying as claimed in claim 3, including the further step of determining said second predetermined period of time to be continuous.

5. A method of displaying an operational time setting to a user of an electronic device in which the user operates a timer setting key, comprising the steps of:

incrementing a setting time relating to a time of operation of the electronic device by depressing the timer setting key;

determining whether the incremented setting time is equal to a desired OFF time;

upon determining the incremented setting time is not equal to the desired OFF time, displaying the incremented time setting for a first predetermined period of time;

upon determining the incremented setting time is equal to the desired OFF time, displaying the incremented setting time for a second predetermined period of time longer than said first period of time; and determining whether the timer setting key is depressed and, if depressed, repeating said step of incrementing and, if not depressed, determining the timer setting of the electronic device.

6. The method of displaying as claimed in claim 5, including the further step of determining said second predetermined period of time to be continuous.

* * * * *